April 10, 1928.
F. N. CONNET
THERMOSTATIC BRAKE
Filed Jan. 4, 1927
1,665,201
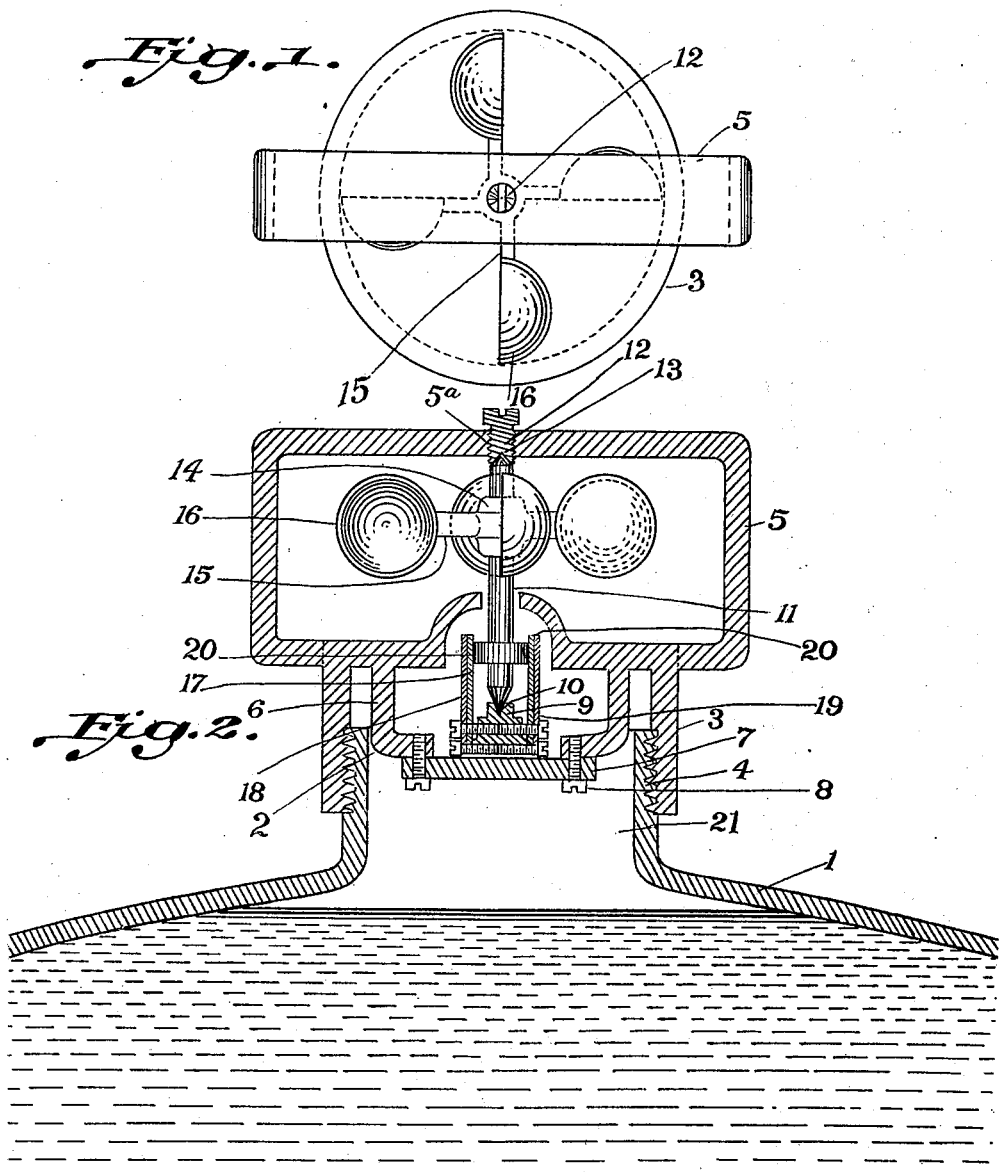
INVENTOR
Frederick N. Connet
BY
Thomas A. Jenkes Jr.
ATTORNEY Patented Apr. 10, 1928.

1,665,201

UNITED STATES PATENT OFFICE.

FREDERICK N. CONNET, OF PROVIDENCE, RHODE ISLAND, ASSIGNOR TO BUILDERS IRON FOUNDRY, OF PROVIDENCE, RHODE ISLAND, A CORPORATION OF RHODE ISLAND.

THERMOSTATIC BRAKE.

Application filed January 4, 1927. Serial No. 159,007.

This invention relates to a device for indicating the overheating of a motor or other object, and more particularly to a device having a rotative signalling member and broadly to thermostatic brakes.

This invention aims to provide an indicating device having a rotary member which under ordinary circumstances will be in motion, but which upon any abnormal occurrence causing the object to which it is attached to become excessively hot, will cause the rotative member to stop turning, thereby giving a visual signal.

Another object of the invention is to provide a device which will be ornamental, at the same time having practical utility.

While the invention is applicable to any object generating or transmitting heat, it is particularly adapted for use in connection with internal combustion engines, especially in motor driven vehicles, such as the automobile and the airplane. For the sake of illustration I shall describe my invention herein in connection with an automobile motor.

In carrying out my invention, I have provided a device having a cap adapted to be secured over the ordinary opening in the top of an automobile radiator. This cap supports a frame or bracket extending upwardly and a second part or member which extends downwardly into the interior of the radiator. Between the upper and lower members thus provided a shaft is journaled so that it may rotate freely and to this shaft is secured a rotative member adapted to be rotated by the impact of air against it. When used in connection with an automobile, it will be readily seen that this rotative member will ordinarily be in motion so long as the car is moving since the resistance of the air to the moving vehicle will cause it to rotate. Secured to the member extending into the interior of the radiator are two metal strips, each composed of metals having different co-efficients of expansion so that each serves as a thermostat. These metal strips extend in a direction parallel to the rotative shaft and are in a position to make tangential contact with a brake drum fastened to the shaft. The metal strips are constructed so that when the temperature exceeds a critical amount, these oppositely positioned thermostat strips will contact against the brake band, thus stopping the rotation of the rotative member and thereby giving a visual signal that the motor has become excessively hot. As in Boyce Patent #1,090,776, the thermo-responsive element is preferably located in the air space above the water level in the radiator, so that it will not be normally acted upon unless steam is suddenly formed in the radiator. My invention, however, is adapted to a broader field of uses and may be used in any case where it is desired to control by means of a thermostatic brake or clutch the rotation of a shaft. It is obvious that by merely putting the metal with a lesser degree of expansion of the outside rather than the inside, the thermostat may be constructed to release at desired predetermined temperatures. It is also obvious that thermostats may be constructed to function at any predetermined temperature by merely varying the metal constituents or alloys employed.

These and such other objects of my invention as may hereinafter appear will be best understood from a description of one embodiment thereof, such as is shown in the accompanying drawing.

Referring now to the drawings, Fig. 1 is a top plan view of the device, showing the rotative member and Fig. 2 is a sectional view showing one manner in which the rotative member may be mounted on an automobile radiator.

In the drawings, wherein like characters of reference indicate like parts throughout, the numeral 1 serves to indicate the top of a motor radiator having the usual filling opening 2. My device may be secured to the radiator in any suitable manner as by means of the cap 3 which makes threaded connection with the lip 4 surrounding the opening 2. Secured to the cap and extending above the radiator is a frame or bracket 5 for supporting the rotative member. Also secured to the cap member 3, and extending downwardly into the interior of the radiator is a bracket or frame member which may, if desired, be integrally formed but which preferably comprises the bracket member 6 and the base 7, which may be secured to the bracket 6 in any convenient manner as by the screws 8. Secured to the upper side of the base member 7 is a protuberance 9 which may be secured to or formed integrally with the base member and which is provided at its upper end with a bearing socket 10 for the shaft 11. The other end of said shaft is journalled in a similar bearing socket 13, preferably in the end of a screw 12 adjustably threaded through a socket 5ª in the upper end of the frame 5 and positioned preferably directly above the center of the radiator opening 2. The shaft 11, which is tapered at both ends so as to make point bearing connections is thus freely rotatable. Secured to the shaft 11 are lugs 14 carrying the radial arms 15 at the extremity of each of which is a hemispherical cup 16. These cups are all similarly mounted with their diameters in vertical planes and their cup portions projecting anti-clockwise circumferentially, so that any appreciable impact of air will cause them to revolve, thereby turning the shaft 11. Any other device adapted to be revolved by the impact of the air may be used. For example, while I prefer to use hemispherical cups, blades or other suitable members may be substituted therefor and in the claims I employ the word "blade" to signify any suitable means for this purpose.

Surrounding the shaft 11, and preferably positioned below the exterior of the radiator cap member 3 is a brake drum 17. If desired, however, the drum may be dispensed with. Secured at one end to the protuberance 9 and extending in a direction parallel with the shaft 11 are two thermostat strips 18 and 19, the opposite ends of these strips extending tangentially across the brake drum 17 in opposed relation to form the thermostatic brake band 20. These thermostat strips may be formed in any suitable manner, being preferably composed of two metals having different co-efficients of expansion, such as invar and brass and which will be drawn in against the brake drum by the rising temperature of the engine causing unequal expansion thereof. When the engine becomes excessively overheated or reaches a temperature greater than a predetermined temperature, the vise-like action of these thermostat strips will cause them to act as a brake band and to tighten on the shaft 11, thus preventing its further rotation. The failure of the rotative member to rotate will thus be a signal notifying the driver, operator or other person of some trouble within the engine which is causing it to become too greatly overheated. It is obvious, however, that in place of the two thermostatic strips any suitable thermo-responsive means, which may also function as a brake may be employed. As stated in Boyce Patent 1,090,776, I preferably locate the entire thermo-responsive means, including the portion, which functions against the rotatable shaft, within the radiator, but normally above the water level.

The operation of my invention is obvious from the above description. When the vehicle containing my invention is set in motion, it is obvious that the impingement of air against the blades 16 will cause them to rotate the shaft. The shaft will continue to rotate until an excessive amount of overheating occurs within the radiator. When steam is formed in the air space 21 above the water level the temperature will suddenly rise to cause the metal strips 18 and 19 to contract against the brake drum 17 to stop rotation of the shaft 11 and the then motionless indicating cups 16 will indicate to the driver that the engine is overheated.

Though I have shown my invention adapted to the cooling system of an automobile, it is obvious that it may be employed in any other device for signalling purposes, or otherwise, which includes a shaft normally rotated by the impingement of air thereon or otherwise and thermo-responsive means, preferably a thermo-responsive brake to control the rotation of the shaft. As stated, by varying the position of the metals of different co-efficients of contraction or expansion, the thermo-responsive means may be made to function broadly as a clutch, either if desired to release when a predetermined temperature is attained to permit revolution, of the shaft, or to function as a brake when a predetermined temperature is attained to stop rotation of the shaft.

I employ the word "brake" in a broad sense to include any member extending from or towards a rotative member adapted of itself to contract against said member, or any extensions thereof or against an adjacent member either to stop the rotation of said member or to release said member so that it may rotate or to bind said member to another member as is usual in clutches. I employ the word "bind" to cover actual contraction between the brake and any member or extensions thereof against which it may contract to function.

It is understood that my invention is not limited to the specific structure shown, and that various deviations may be made therefrom without departing from the spirit and scope of the appended claims.

What I claim as new and desire to secure by Letters Patent is:

1. In a vehicle having a system for indicating abnormal conditions in its internal combustion engine provided with a liquid circulation cooling system for the cylinders of the engine, said cooling system including a radiator having an air space at the top thereof, a shaft rotatably mounted on said radiator with a portion thereof exterior of said radiator and a portion thereof interior of said radiator, means attached to the portion of said shaft exterior of said radiator to cause rotation thereof on impingement of air thereon on normal travel of said vehicle, a brake drum attached to the portion of said shaft interior of said radiator and a thermo-responsive element mounted within said radiator so as to be exposed to the temperature of said air space above the level of the liquid in the radiator adapted to contract against said brake drum to function as the brake band to stop the rotation of said shaft on excessive overheating of said radiator.

2. In a vehicle having a system for indicating abnormal conditions in its internal combustion engine provided with a liquid circulation cooling system for the cylinders of the engine, said cooling system including a radiator, a shaft rotatably mounted on said radiator with a portion thereof exterior of said radiator and a portion thereof interior of said radiator, means attached to the portion of said shaft exterior of said radiator to cause rotation thereof on impingement of air thereon on normal travel of said vehicle and a thermo-responsive element mounted within said radiator so as to be exposed to the temperature therein adapted to bind said shaft to function as a brake band to stop the rotation of said shaft on excessive overheating of said radiator.

3. In a vehicle having a system for indicating abnormal conditions in its internal combustion engine provided with a liquid circulation cooling system for the cylinders of the engine, said cooling system including a radiator having an air space at the top thereof and an opening in the upper end thereof, a cap for said radiator opening having a hole therein, a bracket attached to said cap exterior of said radiator having an adjustable bearing point therein directly above said hole, a detachable bracket attached to said cap below the top thereof having a bearing point therein directly below said hole, a rotatable shaft mounted on said bearing points and extending through said hole having indicating blades mounted thereon above said cap adapted to cause rotation of said shaft on impingement of air thereon on normal movement of said vehicle, a brake drum mounted on said shaft within said radiator, and thermo-responsive means mounted within said air space at the top of said radiator comprising strips of metal of different selected co-efficients of expansion adapted to contract against said brake drum on excessive overheating of said radiator to stop the rotation of said shaft.

4. In a vehicle having a system for indicating abnormal conditions in its internal combustion engine provided with a liquid circulation cooling system for the cylinders of the engine, said cooling system including a radiator and an opening in the upper end thereof, a cap for said radiator opening having a hole therein, a bracket attached to said cap exterior of said radiator having an adjustable bearing point therein directly above said hole, a detachable bracket attached to said cap below the top thereof having a bearing point therein directly below said hole, a rotatable shaft mounted on said bearing points and extending through said hole having indicating blades mounted thereon above said cap adapted to cause rotation of said shaft on impingement of air thereon on normal movement of said vehicle and thermo-responsive means mounted within said radiator comprising strips of metal of different selected co-efficients of expansion adapted to bind against said shaft on excessive overheating of said radiator to stop the rotation thereof.

5. A signalling device comprising a shaft, means to rotate said shaft and thermo-responsive means adapted to bind the rotative member to control rotation thereof on application thereto of a predetermined amount of heat.

6. In combination, a rotatable shaft and a thermostatic brake adapted to bind said shaft to control the rotation thereof comprising metal strips of different co-efficients of expansion joined together.

In testimony whereof I affix my signature.

FREDERICK N. CONNET.